United States Patent
Gaynor

(10) Patent No.: US 11,841,554 B2
(45) Date of Patent: Dec. 12, 2023

(54) EYEWEAR INTERFACE ASSEMBLY

(71) Applicant: Brandon Gaynor, Rancho Cucamonga, CA (US)

(72) Inventor: Brandon Gaynor, Rancho Cucamonga, CA (US)

( * ) Notice: Subject to any disclaimer, the term of this patent is extended or adjusted under 35 U.S.C. 154(b) by 345 days.

(21) Appl. No.: 17/243,718

(22) Filed: Apr. 29, 2021

(65) Prior Publication Data

US 2022/0350142 A1    Nov. 3, 2022

(51) Int. Cl.
*G02B 27/01* (2006.01)
*G02C 11/00* (2006.01)

(52) U.S. Cl.
CPC .......... *G02C 11/10* (2013.01); *G02B 27/0172* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 4,934,773 A | 6/1990 | Becker | |
| D375,495 S | 11/1996 | MacIness | |
| 5,634,201 A | 5/1997 | Mooring | |
| D426,845 S | 6/2000 | Green | |
| 6,349,001 B1 | 2/2002 | Spitzer | |
| 8,550,621 B2 | 10/2013 | Jannard | |
| 8,814,691 B2 | 8/2014 | Haddick | |
| 2006/0093178 A1* | 5/2006 | Chen | H04R 1/1058 381/370 |
| 2006/0132382 A1* | 6/2006 | Jannard | G02B 27/017 345/8 |
| 2008/0143954 A1* | 6/2008 | Abreu | G06F 3/167 351/158 |
| 2011/0291929 A1* | 12/2011 | Yamada | G06F 3/0346 345/158 |
| 2017/0115742 A1* | 4/2017 | Xing | G06F 3/0485 |
| 2020/0052254 A1* | 2/2020 | Ohshima | G02C 11/10 |
| 2021/0223577 A1* | 7/2021 | Zhang | G10L 21/0208 |

FOREIGN PATENT DOCUMENTS

CA        2362895       12/2002
CN     207924289 U  *  9/2018

* cited by examiner

*Primary Examiner* — Shan Liu

(57) ABSTRACT

An eyewear interface assembly for facilitating a hands-free interface with a personal electronic device includes a pair of eyeglasses that can be worn on a user for vision correction. The pair of eyeglasses includes a frame which comprises a pair of lens loops and a pair of arms each hingedly coupled to a respective lens loop. A pair of lenses is each positioned in a respective one of the lens loops and each of the lenses has a transparent display integrated therein to display indicia to the user. A transceiver is integrated into the pair of eyeglasses to receive an audio signal and a video signal from a personal electronic device. A pair of ear buds is each coupled to the pair of eyeglasses to be positioned in a respective one of the user's ears when the user wears the pair of eyeglasses.

3 Claims, 6 Drawing Sheets

EYEWEAR INTERFACE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to eyewear devices and more particularly pertains to a new eyewear device for facilitating a hands-free interface with a personal electronic device. The device includes a pair of eyeglasses, transparent displays in the eyeglasses, ear buds and a video camera integrated into the eyeglasses. The eyeglasses have wireless communication capabilities for receiving a video signal and an audio signal from a personal electronic device.

(2) Description of Related Art Including Information Disclosed Under 37 CFR 1.97 and 1.98

The prior art relates to eyewear devices including a variety of hands-free interface devices that include an article of eyewear and displays being integrated into lenses of the eyewear for displaying indicia to a user and which include ear buds. The prior art discloses a pair of eyeglasses that has a display integrated into at least one of the lenses for displaying video imagery. In no instance does the prior art disclose a pair of eyeglasses that include transparent displays in combination with a video camera which can perform as a hands-free interface with a personal electronic device.

BRIEF SUMMARY OF THE INVENTION

An embodiment of the disclosure meets the needs presented above by generally comprising a pair of eyeglasses that can be worn on a user for vision correction. The pair of eyeglasses includes a frame which comprises a pair of lens loops and a pair of arms each hingedly coupled to a respective lens loop. A pair of lenses is each positioned in a respective one of the lens loops and each of the lenses has a transparent display integrated therein to display indicia to the user. A transceiver is integrated into the pair of eyeglasses to receive an audio signal and a video signal from a personal electronic device. A pair of ear buds is each coupled to the pair of eyeglasses to be positioned in a respective one of the user's ears when the user wears the pair of eyeglasses.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
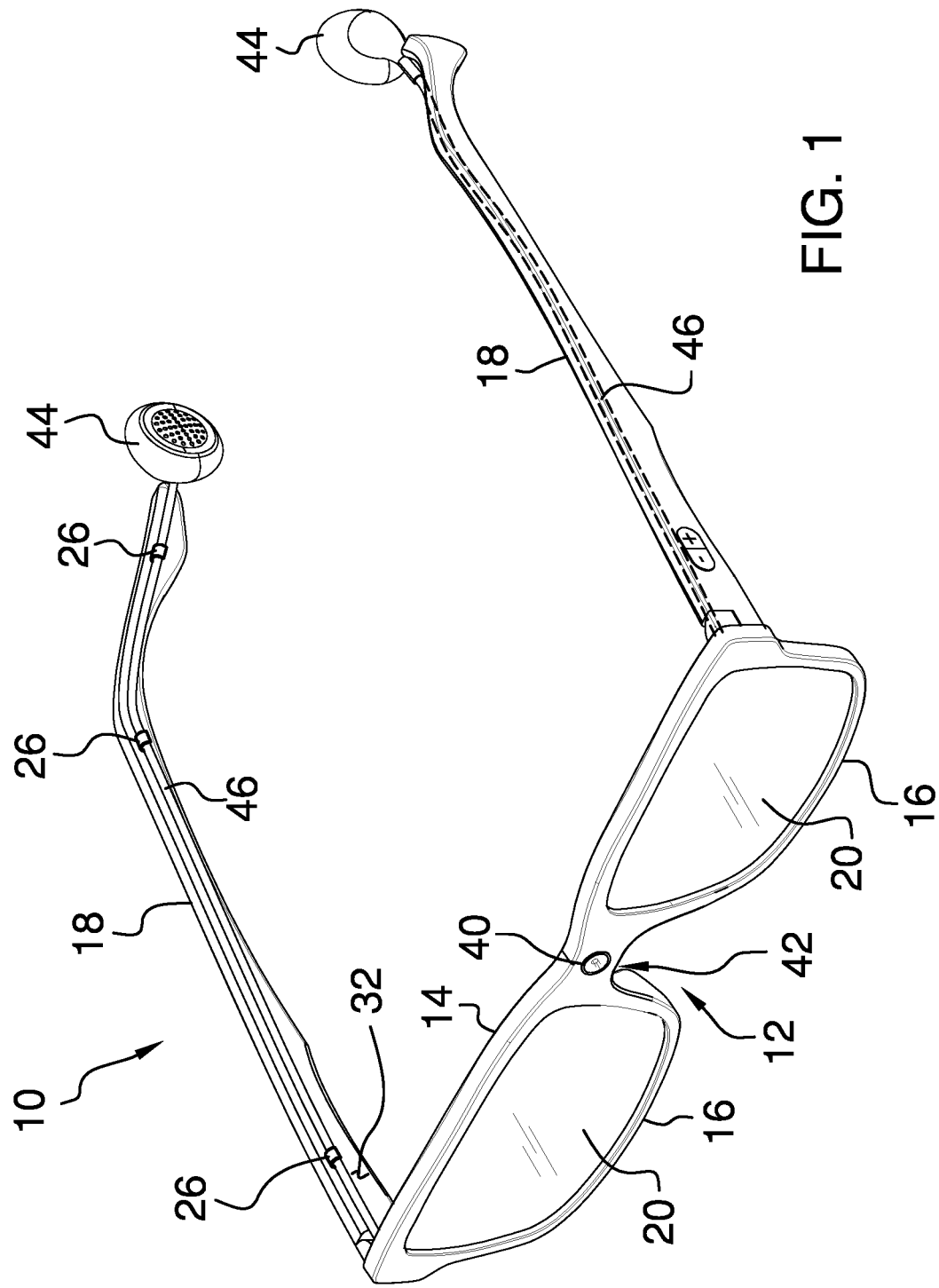
FIG. 1 is a front perspective view of an eyewear interface assembly according to an embodiment of the disclosure.
Figure 2:
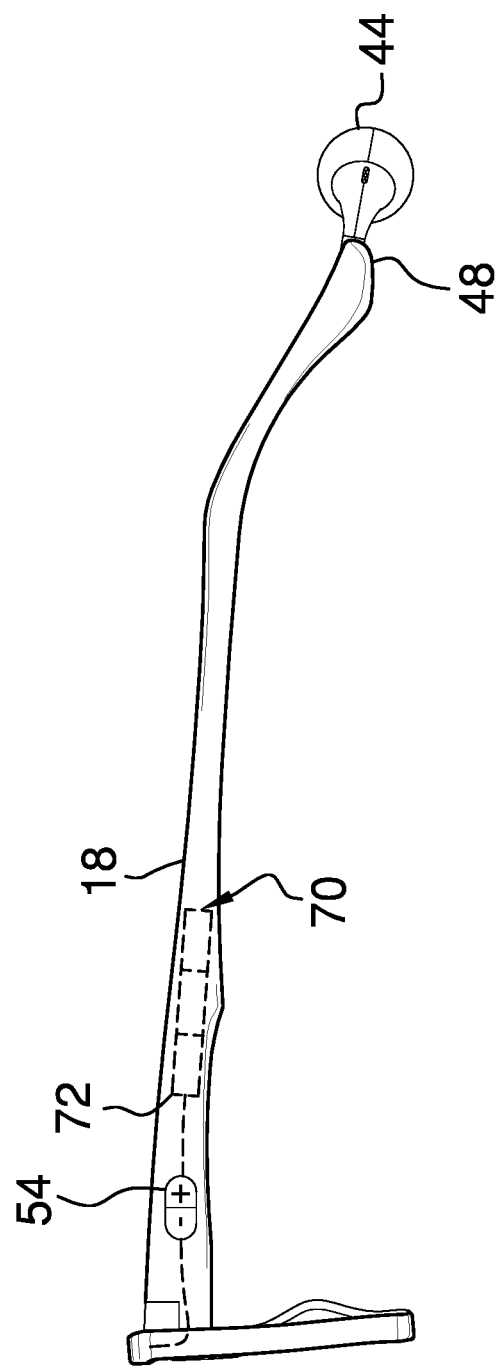
FIG. 2 is a left side phantom view of an embodiment of the disclosure.
Figure 3:
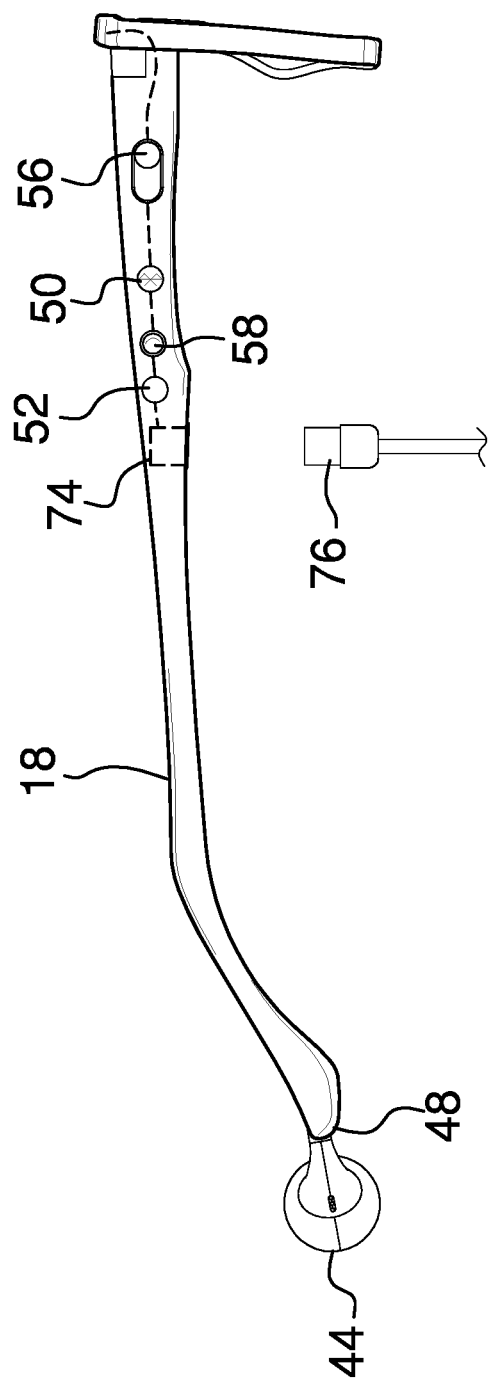
FIG. 3 is a right side phantom view of an embodiment of the disclosure.

With reference now to the drawings, and in particular to FIGS. 1 through 6 thereof, a new eyewear device embodying the principles and concepts of an embodiment of the disclosure and generally designated by the reference numeral 10 will be described.

As best illustrated in FIGS. 1 through 6, the eyewear interface assembly 10 generally comprises a pair of eyeglasses 12 that can be worn on a user for vision correction. The pair of eyeglasses 12 includes a frame 14 which comprises a pair of lens loops 16 and a pair of arms 18 each being hingedly coupled to a respective lens loop 16. The frame 14 may be constructed of a resiliently flexible material thereby inhibiting the frame 14 from being damaged. Moreover, the frame 14 may be structured to mimic popular designs and styles of eyeglasses.

The pair of eyeglasses 12 includes a pair of lenses 20 that is each positioned in a respective one of the lens loops 16. Each of the lenses 20 is comprised of a translucent material to pass light therethrough. Additionally, each of the lenses 20 has a transparent display 22 integrated therein such that each of the lenses 20 can display indicia 24 to the user. The transparent display 22 may comprise a transparent organic light emitting diode or other similar type of transparent, electronic display. Each of the lenses 20 may additionally employ transition technology such that the lenses 20 darken when exposed to sunlight.

A plurality of clips 26 is provided and each of the clips 26 is coupled to a respective one of the arms 18 of the frame 14. Each of the clips 26 has a pair of sections that is biased toward each other for gripping an object. The plurality of clips 26 includes a set of first clips 28 and a set of second clips 30. Each of the first clips 28 and each of the second clips 30 are positioned on and are distributed along an inwardly facing surface 32 of the respective arm 18.

A control circuit 34 is integrated into the pair of eyeglasses 12 and the transparent display 22 in each of the lenses 20 is electrically coupled to the control circuit 34. A transceiver 36 is integrated into the pair of eyeglasses 12 and the transceiver 36 is in wireless communication with the personal electronic device 38. In this way the transceiver 36 can receive the audio signal and the video signal from the personal electronic device 38. Moreover, the transceiver 36 is in communication with the transparent display 22 in each of the lenses 20 to display imagery received from the personal electronic device 38. The transceiver 36 may comprise a radio frequency transceiver or the like and the transceiver 36 may employ Bluetooth communication protocols.

A video camera 40 is integrated into the pair of eyeglasses 12 to record video footage of the environment surrounding the pair of eyeglasses 12. The video camera 40 may comprise a miniaturized, digital video camera or the like that is commonly associated with smart phones. Additionally, the video camera 40 may be positioned on a nose bridge 42 of the frame 14 of the pair of eyeglasses 12. A pair of ear buds 44 is each coupled to the pair of eyeglasses 12 such that each of the ear buds 44 can be positioned in a respective one of the user's ears when the user wears the pair of eyeglasses 12. Each of the ear buds 44 is in communication with the transceiver 36 to receive the audio signal from the personal electronic device 38 to facilitate the user to hear the audio.

Each of the ear buds 44 includes a conductor 46 that extends along the inwardly facing surface 32 of a respective one of the arms 18 such that each of the ear buds 44 is positioned adjacent to a distal end 48 of the respective arm 18. In this way each of the ear buds 44 is positioned adjacent to the respective ear when the eyeglasses 12 are being worn. The conductor 46 associated with each of the ear buds 44 is removably engaged to respective ones of the first clips 28 and the second clips 30 for storage. Conversely, the conductor 46 associated with each of the ear buds 44 is removable from the respective first clips 28 and the second clips 30 thereby facilitating the ear buds 44 to be employed. The conductor 46 associated with each of the ear buds 44 is electrically coupled to the control circuit 34.

A connect button 50 is movably integrated into a respective arm 18 of the pair of eyeglasses 12 and the connect button 50 is electrically coupled to the transceiver 36. The transceiver 36 connects to the personal electronic device 38 when the connect button 50 is depressed. A reset button 52 is movably integrated in a respective arm 18 of the pair of eyeglasses 12 and the reset button 52 is electrically coupled to the transceiver 36. The transceiver 36 disconnects from the personal electronic device 38 when the reset button 52 is depressed.

A volume button 54 is movably integrated into a respective arm 18 of the pair of eyeglasses 12 and the volume button 54 is electrically coupled to the control circuit 34. The volume button 54 is urgeable in an up direction or a down direction for increasing or decreasing the volume of the ear buds 44. A power button 56 is slidably integrated into a respective arm 18 of the pair of eyeglasses 12 and the power button 56 is electrically coupled to the control circuit 34. The power button 56 is slidable between an on position and an off position for turning the control circuit 34 on and off.

A light emitter 58 is integrated into a respective arm 18 of the pair of eyeglasses 12 to emit light outwardly therefrom. The light emitter 58 is electrically coupled to the transceiver 36 and the light emitter 58 is turned on when the transceiver 36 successfully connects to the personal electronic device 38. The light emitter 58 may comprise a light emitting diode or the like and the light emitter 58 facilitates a visual alert that the transceiver 36 is connected to the personal electronic device 38.

Figure 4:
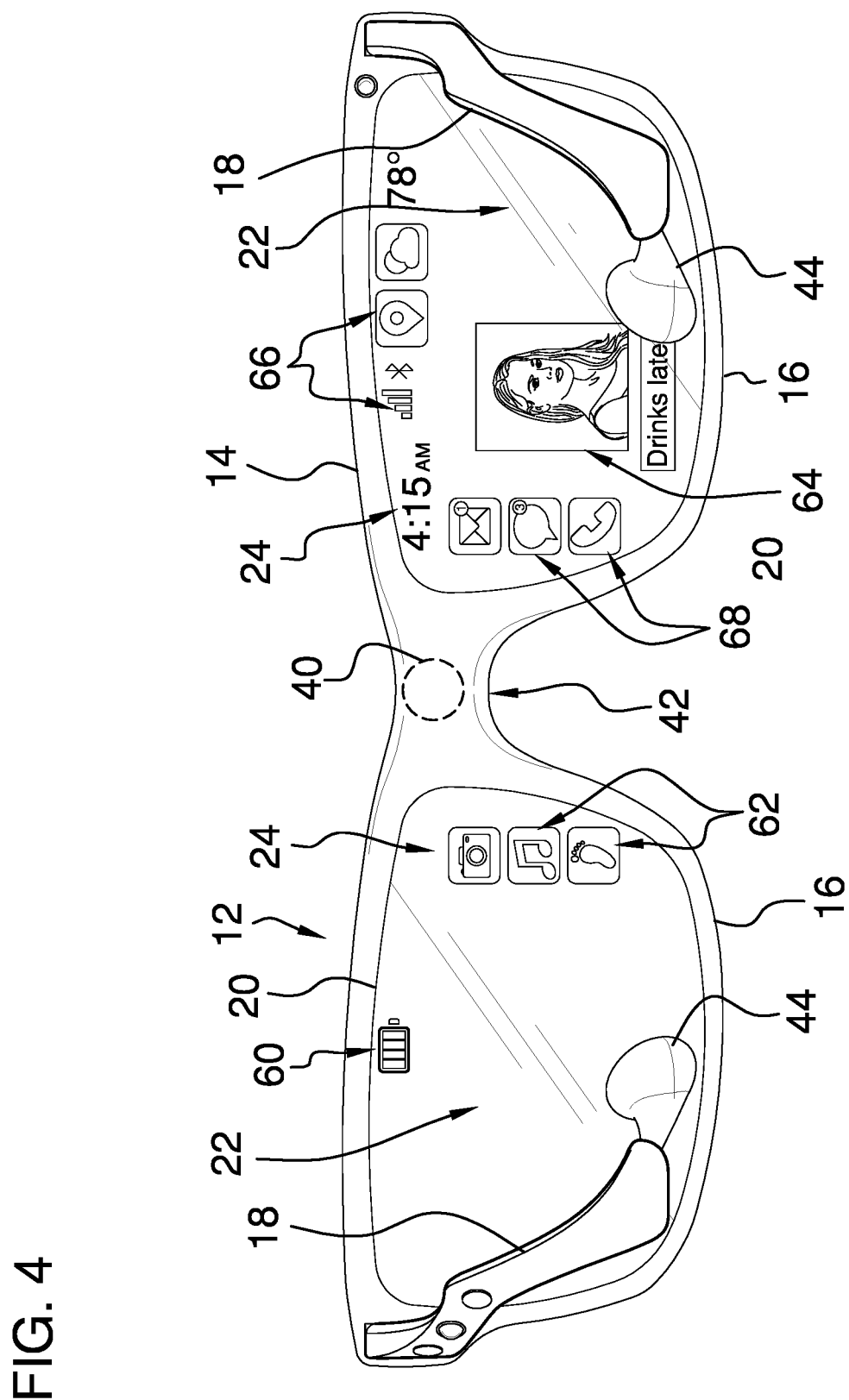
FIG. 4 is a back view of an embodiment of the disclosure showing indicia displayed on a pair of lenses.
Figure 5:
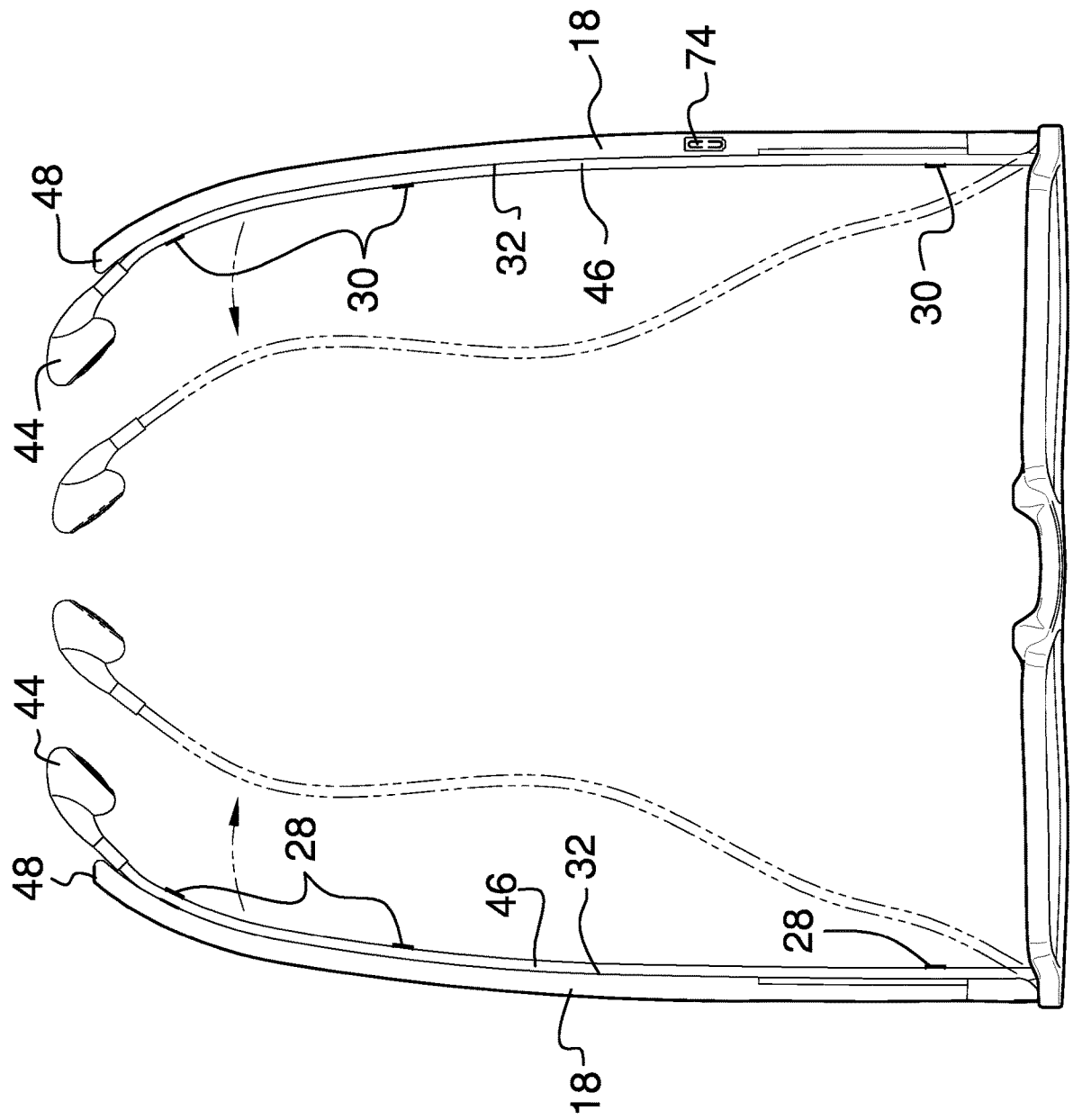
FIG. 5 is a top view of an embodiment of the disclosure.
Figure 6:
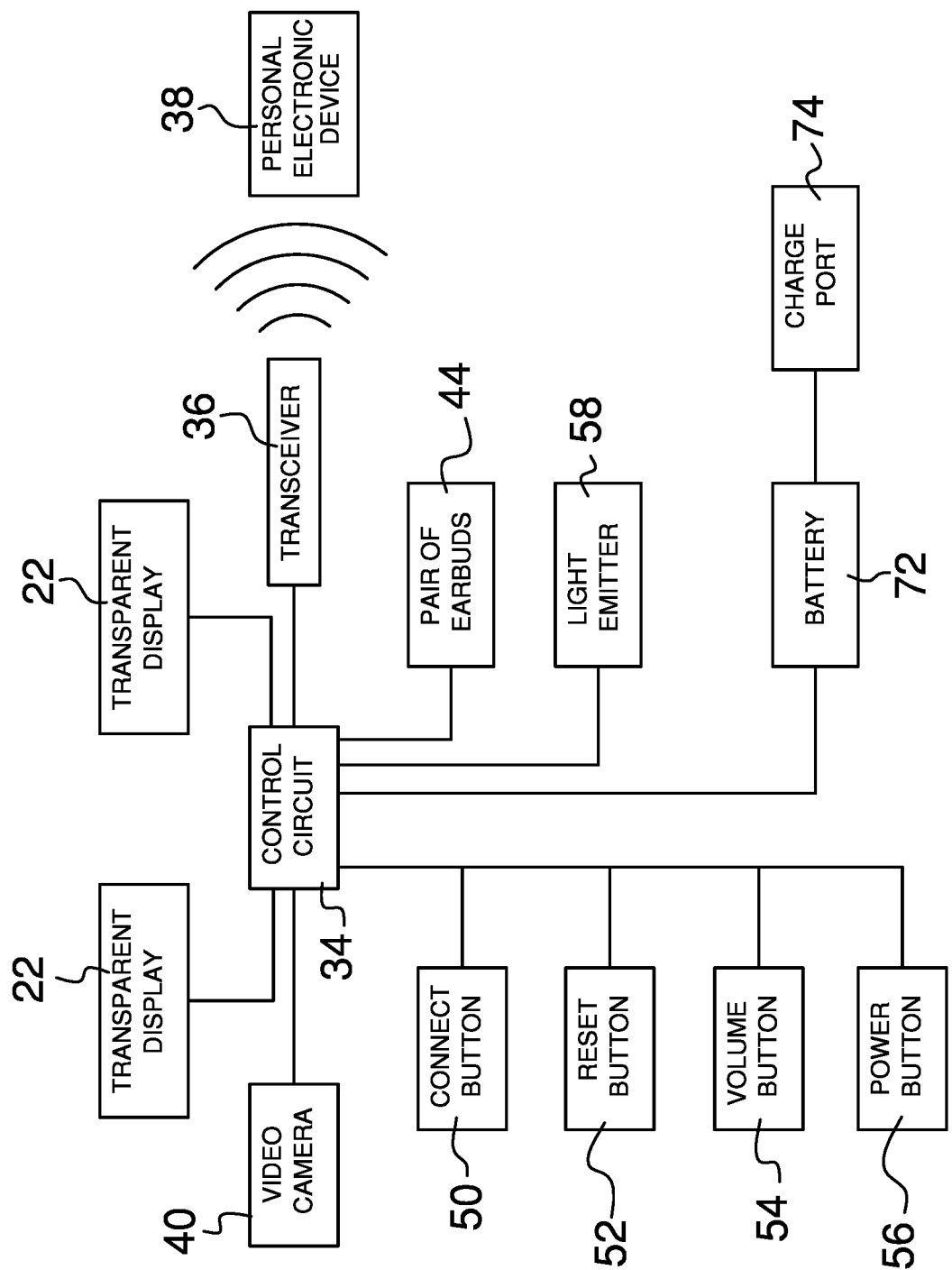
FIG. 6 is a schematic view of an embodiment of the disclosure.

As is most clearly shown in FIG. 4, the indicia 24 displayed on the left lens may include, but not be limited to, a battery meter 60 and a plurality of app icons 62. The indicia 24 on the right lens may include, but not be limited to, a video chat window 64, notification icons 66, and app icons 68. Moreover, the indicia 24 displayed on each of the left lens and the right lens may comprise indicia that would commonly be visible on a display of the personal electronic device 38. A power supply 70 is integrated into the pair of eyeglasses 12 and the power supply 70 is electrically coupled to the control circuit 34. The power supply 70 comprises a battery 72 is integrated into a respective arm 18 of the pair of eyeglasses 12 and which is electrically coupled to the control circuit 34. The power supply 70 includes a charge port 74 that is recessed into a respective arm 18 of the pair of eyeglasses 12 to receive a charge cord 76, and the charge port 74 is electrically coupled to the battery 72 for charging the battery 72.

In use, the eyeglasses 12 are worn in the traditional convention of eyeglasses 12 and the power button 56 is moved into the on position. The connect button 50 is depressed to connect the transceiver 36 to the personal electronic device 38 for subsequently displaying indicia 24 on the transparent display 22 in each of the lenses 20. In this way the eyeglasses 12 serve as a hands-free interface with the personal electronic device 38. The ear buds 44 can be employed in the traditional convention of ear buds 44 for listening to music and audio for video.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An eyewear interface assembly for displaying imagery and sounds received from a personal electronic device, said assembly comprising:
 a pair of eyeglasses being configured to be worn on a user for vision correction, said pair of eyeglasses including a frame comprising a pair of lens loops and a pair of arms each being hingedly coupled to a respective lens loop, said pair of eyeglasses including a pair of lenses each being positioned in a respective one of said lens loops, each of said lenses being comprised of a translucent material wherein said lenses are configured to pass light therethrough, each of said lenses having a transparent display being integrated therein wherein each of said lenses is configured to display indicia to the user;
 a transceiver being integrated into said pair of eyeglasses, said transceiver being in wireless communication with the personal electronic device wherein said transceiver is configured to receive an audio signal and a video signal from the personal electronic device, said transceiver being in communication with said transparent display in each of said lenses wherein said transparent display in each of said lenses is configured to display imagery received from the personal electronic device;
 a video camera being integrated into said pair of eyeglasses wherein said video camera is configured to record video footage of the environment surrounding said pair of eyeglasses;
 a pair of ear buds, each of said ear buds being coupled to said pair of eyeglasses wherein each of said ear buds is configured to be positioned in a respective one of the user's ears in a case that the user wears said pair of eyeglasses, each of said ear buds being in communication with said transceiver wherein each of said ear buds is configured to receive the audio signal from the personal electronic device to facilitate the user to hear the audio;
 a plurality of clips, each of said clips being coupled to a respective one of said arms of said frame, each of said clips having a pair of sections being biased toward each other for gripping an object, said plurality of clips including a set of first clips and a set of second clips, each of said first clips and each of said second clips being positioned on and being distributed along an inwardly facing surface of said respective arm; and
 wherein each of said ear buds includes a conductor extending along an inwardly facing surface of a respective one of said arms having each of said ear buds being positioned adjacent to a distal end of said respective arm wherein each of said ear buds is configured to be positioned adjacent to the respective ear in a case that said pair of eyeglasses is being worn, said conductor associated with each of said ear buds being removably engaged to respective ones of said first clips and said second clips for storage, said conductor associated with each of said ear buds being removable from said respective first clips and said second clips thereby facilitating said ear buds to be employed.

2. An eyewear interface assembly for displaying imagery and sounds received from a personal electronic device, said assembly comprising:
 a pair of eyeglasses being configured to be worn on a user for vision correction, said pair of eyeglasses including a frame comprising a pair of lens loops and a pair of arms each being hingedly coupled to a respective lens loop, said pair of eyeglasses including a pair of lenses each being positioned in a respective one of said lens loops, each of said lenses being comprised of a translucent material wherein said lenses are configured to pass light therethrough, each of said lenses having a transparent display being integrated therein wherein each of said lenses is configured to display indicia to the user;
 a control circuit being integrated into said pair of eyeglasses, said transparent display in each of said lenses being electrically coupled to said control circuit;
 a transceiver being integrated into said pair of eyeglasses, said transceiver being in wireless communication with the personal electronic device wherein said transceiver is configured to receive an audio signal and a video signal from the personal electronic device, said transceiver being in communication with said transparent display in each of said lenses wherein said transparent display in each of said lenses is configured to display imagery received from the personal electronic device;
 a video camera being integrated into said pair of eyeglasses wherein said video camera is configured to record video footage of the environment surrounding said pair of eyeglasses;
 a pair of ear buds, each of said car buds being coupled to said pair of eyeglasses wherein each of said ear buds is configured to be positioned in a respective one of the user's ears in a case that the user wears said pair of eyeglasses, each of said ear buds being in communication with said transceiver wherein each of said car buds is configured to receive the audio signal from the personal electronic device to facilitate the user to hear the audio;
 a connect button being movably integrated into a respective arm of said pair of eyeglasses, said connect button being electrically coupled to said transceiver, said transceiver connecting to the personal electronic device in a case that said connect button is depressed;
 a reset button being movably integrated in a respective arm of said pair of eyeglasses, said reset button being electrically coupled to said transceiver, said transceiver disconnecting from the personal electronic device in a case that said reset button is depressed;
 a volume button being movably integrated into a respective arm of said pair of eyeglasses, said volume button being electrically coupled to said control circuit, said volume button being urgeable in an up direction or a down direction for increasing or decreasing the volume of said ear buds;
 a power button being slidably integrated into a respective arm of said pair of eyeglasses, said power button being electrically coupled to said control circuit, said power button being slidable between an on position and an off position for turning said control circuit on and off;
 a light emitter being integrated into a respective arm of said pair of eyeglasses wherein said light emitter is configured to emit light outwardly therefrom, said light emitter being electrically coupled to said transceiver, said light emitter being turned on in a case that said transceiver successfully connects to the personal electronic device;
 a power supply being integrated into said pair of eyeglasses, said power supply being electrically coupled to said control circuit, said power supply comprising:
  a battery being integrated into a respective arm of said pair of eyeglasses, said battery being electrically coupled to said control circuit; and a charge port being recessed into a respective arm of said pair of eyeglasses wherein said charge port is configured to receive a charge cord, said charge port being electrically coupled to said battery for charging said battery;

wherein said assembly includes a plurality of clips, each of said clips being coupled to a respective one of said arms of said frame, each of said clips having a pair of sections being biased toward each other for gripping an object, said plurality of clips including a set of first clips and a set of second clips, each of said first clips and each of said second clips being positioned on and being distributed along an inwardly facing surface of said respective arm; and wherein each of said ear buds includes a conductor extending along an inwardly facing surface of a respective one of said arms having each of said ear buds being positioned adjacent to a distal end of said respective arm wherein each of said ear buds is configured to be positioned adjacent to the respective ear in a case that said pair of eyeglasses is being worn, said conductor associated with each of said ear buds being removably engaged to respective ones of said first clips and said second clips for storage, said conductor associated with each of said ear buds being removable from said respective first clips and said second clips thereby facilitating said ear buds to be employed, said conductor associated with each of said ear buds being electrically coupled to said control circuit.

3. An eyewear interface system for displaying imagery and sounds received from a personal electronic device, said system comprising:

the personal electronic device having wireless communication capabilities for streaming an audio signal and a video signal;

a pair of eyeglasses being configured to be worn on a user for vision correction, said pair of eyeglasses including a frame comprising a pair of lens loops and a pair of arms each being hingedly coupled to a respective lens loop, said pair of eyeglasses including a pair of lenses each being positioned in a respective one of said lens loops, each of said lenses being comprised of a translucent material wherein said lenses are configured to pass light therethrough, each of said lenses having a transparent display being integrated therein wherein each of said lenses is configured to display indicia to the user;

a plurality of clips, each of said clips being coupled to a respective one of said arms of said frame, each of said clips having a pair of sections being biased toward each other for gripping an object, said plurality of clips including a set of first clips and a set of second clips, each of said first clips and each of said second clips being positioned on and being distributed along an inwardly facing surface of said respective arm;

a control circuit being integrated into said pair of eyeglasses, said transparent display in each of said lenses being electrically coupled to said control circuit;

a transceiver being integrated into said pair of eyeglasses, said transceiver being in wireless communication with said personal electronic device to receive said audio signal and said video signal from said personal electronic device, said transceiver being in communication with said transparent display in each of said lenses to display imagery received from said personal electronic device;

a video camera being integrated into said pair of eyeglasses wherein said video camera is configured to record video footage of the environment surrounding said pair of eyeglasses;

a pair of ear buds, each of said ear buds being coupled to said pair of eyeglasses wherein each of said ear buds is configured to be positioned in a respective one of the user's ears in a case that the user wears said pair of eyeglasses, each of said ear buds being in communication with said transceiver to receive said audio signal from said personal electronic device to facilitate the user to hear the audio, each of said ear buds includes a conductor extending along an inwardly facing surface of a respective one of said arms having each of said ear buds being positioned adjacent to a distal end of said respective arm wherein each of said ear buds is configured to be positioned adjacent to the respective ear in a case that said pair of eyeglasses is being worn, said conductor associated with each of said ear buds being removably engaged to respective ones of said first clips and said second clips for storage, said conductor associated with each of said ear buds being removable from said respective first clips and said second clips thereby facilitating said ear buds to be employed, said conductor associated with each of said ear buds being electrically coupled to said control circuit;

a connect button being movably integrated into a respective arm of said pair of eyeglasses, said connect button being electrically coupled to said transceiver, said transceiver connecting to said personal electronic device in a case that said connect button is depressed;

a reset button being movably integrated in a respective arm of said pair of eyeglasses, said reset button being electrically coupled to said transceiver, said transceiver disconnecting from said personal electronic device in a case that said reset button is depressed;

a volume button being movably integrated into a respective arm of said pair of eyeglasses, said volume button being electrically coupled to said control circuit, said volume button being urgeable in an up direction or a down direction for increasing or decreasing the volume of said ear buds;

a power button being slidably integrated into a respective arm of said pair of eyeglasses, said power button being electrically coupled to said control circuit, said power button being slidable between an on position and an off position for turning said control circuit on and off;

a light emitter being integrated into a respective arm of said pair of eyeglasses wherein said light emitter is configured to emit light outwardly therefrom, said light emitter being electrically coupled to said transceiver, said light emitter being turned on in a case that said transceiver successfully connects to said personal electronic device; and a power supply being integrated into said pair of eyeglasses, said power supply being electrically coupled to said control circuit, said power supply comprising:
  a battery being integrated into a respective arm of said pair of eyeglasses, said battery being electrically coupled to said control circuit; and
  a charge port being recessed into a respective arm of said pair of eyeglasses wherein said charge port is configured to receive a charge cord, said charge port being electrically coupled to said battery for charging said battery.

* * * * *